United States Patent
Takeda et al.

[11] Patent Number: 5,648,950
[45] Date of Patent: Jul. 15, 1997

[54] HOLOGRAM INTEGRATED WITH A BEAM SPLITTER TO SEPARATE A PLURALITY OF POLARIZED REFLECTED LIGHT BEAMS

[75] Inventors: Tadashi Takeda; Yoshio Hayashi, both of Nagano, Japan

[73] Assignee: Kabushiki Kaisha Sankyo Seiki Seisakusho, Nagano, Japan

[21] Appl. No.: 548,133

[22] Filed: Oct. 25, 1995

[30] Foreign Application Priority Data

Oct. 25, 1994 [JP] Japan ................................. 6-284128
Oct. 26, 1994 [JP] Japan ................................. 6-286052

[51] Int. Cl.⁶ .............................. G11B 7/135; G11B 11/10
[52] U.S. Cl. ........................ 369/110; 369/109; 369/103; 369/112; 369/44.23; 369/44.37
[58] Field of Search ............................ 369/110, 109, 369/103, 112, 44.37, 44.23, 44.28, 44.41; 359/394, 485, 572, 494, 495

[56] References Cited

U.S. PATENT DOCUMENTS

| | | | |
|---|---|---|---|
| 5,136,424 | 8/1992 | Cox et al. ............................ | 359/394 |
| 5,455,712 | 10/1995 | Yamamoto et al. .................. | 359/485 |
| 5,490,133 | 2/1996 | Nakamura et al. ................... | 369/44.23 |
| 5,515,354 | 5/1996 | Miyake et al. ....................... | 369/103 |
| 5,532,999 | 7/1996 | Aikoh et al. ......................... | 369/120 |
| 5,535,055 | 7/1996 | Ono et al. ............................ | 359/495 |
| 5,544,143 | 8/1996 | Kay et al. ............................ | 369/112 |

*Primary Examiner*—Georgia Y. Epps
*Assistant Examiner*—Kim-Kwok Chu
*Attorney, Agent, or Firm*—Sughrue, Mion, Zinn, Macpeak & Seas

[57] ABSTRACT

In an optical pickup system, the light emitted from a source to illuminate an optical recording medium is reflected and directed via a beam splitter to a photodetector so as to read information signals, and a hologram device for splitting the emerging light from the source into a plurality of beams is provided as an integral part of the entrance surface of the beam splitter.

8 Claims, 11 Drawing Sheets

DECREASE

CORRECT

INCREASE

DECREASE  CORRECT  INCREASE

HOLOGRAM INTEGRATED WITH A BEAM SPLITTER TO SEPARATE A PLURALITY OF POLARIZED REFLECTED LIGHT BEAMS

FIELD OF THE INVENTION

The present invention relates to an optical pickup system for reading information from recording media such as optical disks and magnetooptical disks.

BACKGROUND OF THE INVENTION

Recording media such as CDs (compact disks) have the necessary information stored in the form of pit trains (tracks) on the disk surface and the recorded information is read by optical pickups. While various types of optical pickup have been proposed, the common system employs the three-spot method and the astigmatic method as shown in FIG. 20.

In the system, light from a laser 1 is passed through a diffraction grating 7 and a beam splitter 3 so that it is condensed by an objective lens 4. The condensed coherent light is focused on an information track (pit train) on a disk 5 and reflected back to pass through the objective lens 4, beam splitter 3 and a cylindrical lens 8 to enter a photodetector 9.

If the spot of a light beam falling on the disk 5 crosses either edge of a pit, the interference by the illuminating light will reduce the quantity of reflected light compared to the case where reflection occurs in flat areas outside the pit. Hence, with optical pickups of the type shown in FIG. 20, the changes in the quantity of reflected light in accordance with the pit trains are converted to electric signals by means of photodetector 9 for producing an output.

It is practically impossible to expect that commercial optical disks will have the ideal flatness which is entirely free from surface warps and distortions and considering other phenomena such as disk wobbling, keeping the objective lens 4 in the pickup in proper position to the disk surface is most critical for the purpose of correct information reading. To this end, two kinds of control are performed, one being the position control in the tracking direction to ensure that the illuminating light from the source 1 such as a laser will not deviate from a particular pit train (track) and the other being the focus control to keep focusing the laser beam at a position coincident with the information surface of the disk. To accomplish these controls, the present position of the illuminating light must be detected and in the prior art the three-spot method is commonly used to detect tracking errors (TE) and the astigmatic method to detect focus errors (FE).

The principles of these prior art methods are illustrated in FIGS. 20 and 21. In the three-spot method, an incident laser beam is divided by the diffraction grating 7 into three beamlets, the zero-order, the plus first-order and the minus first-order beamlet, which are condensed such that three beam spots will align on the disk 5 slightly angled in the tracking direction of a recorded information. By applying a servo such that the spots of the plus and minus components of the first-order diffracted light on both sides will produce signals of invariably equal intensity for reflected light, the position of the zero-order beam spot in the middle can be maintained at the center of the track. In the astigmatic method, the rays of reflected light from the surface of disk 5 are passed through the cylindrical lens 8 to create astigmatism and the resulting changes in beam spot (with respect to the direction of ellipse and the ellipticity) due to defocusing are detected by, for example, a quadrant photodetector 126 that consist of two pairs of diagonal light-receiving elements (126a/126d and 126b/126c), the outputs of the two pairs are supplied to adders 133 and 134 which in turn output the results of addition to a comparator 135 that produces a FE signal as an output. And the outputs of the adders 133 and 134 are supplied to other adder 136 which outputs the result of addition as a RF signal.

We will now describe, with reference to FIG. 22, a so-called "magnetooptical pickup system" for use in reading information from recording media such as magnetooptical disks. Magnetooptical pickup systems are typically intended to record, reproduce and erase information and, as shown in FIG. 22, have a semiconductor laser 2A as a source of light for illuminating a magnetooptical recording medium 3A, which is spaced from the laser 2A by a collimator lens 4A, a half-prism 5A and an objective lens 6A that are arranged in that order from the laser side.

A linear-polarized (e.g. P-polarized) light beam issuing from the semiconductor laser 2A is rendered parallel by means of collimator lens 4A, passed through half-prism 5A and focused on the magnetooptical recording medium 3A by means of objective lens 6A. Information is recorded on the medium 3A by magnetization in both an upward and a downward direction and, therefore, the plane of polarization of the P-polarized light incident on the medium 3A is rotated by a magnetooptical effect (the so-called Kerr effect) in accordance with the direction of magnetization in the medium 3A. If the plane of polarization is rotated through θ degrees in response to the magnetization in an upward direction, then the same plane of polarization is rotated through −θ degrees in response to the magnetization in a downward direction.

As the result of rotation of its plane of polarization, the reflected light now has an S-polarized component and is collimated again by means of the objective lens 6A and further reflected by half-prism 5A before entering a composite hologram lens 7A. The admitted light beam is divided into a specified number of beamlets by means of the lens 7A and received by a group of photodetectors 8A, the outputs of the photodetectors 8A are supplied to a detection circuit 9A which generates an information signal, a focus detection signal and a tracking detection signal.

The aforementioned prior art optical pickups have the following disadvantages. The optical pickup shown in FIG. 20 contains many lens-related parts such as diffraction grating 7, beam splitter 3 and cylindrical lens 8 and, what is more, determining the layout of these parts and bringing them into registry are so much time-consuming that the overall system becomes complicated to be unfavorable for the purpose of achieving a higher production rate.

In the magnetooptical pickup shown FIG. 22, a plurality of hologram devices of different kinds are used and, in addition, it contains many lens-related parts such as collimator lens 4A, half-prism 5A, objective lens 6A and composite hologram lens 7A and, what is more, determining the layout of these parts and bringing them into registry are so much time-consuming that the overall system becomes complicated to be unfavorable for the purpose of achieving a higher production rate.

Another problem with the magnetooptical pickup of the construction shown in FIG. 22 is that it is designed as an apparatus that performs information recording, reproduction and erasure with a magnetooptical disk being used as an information medium and that therefore it is practically impossible to apply the pickup to use with optical recording media other than magnetooptical ones as required.

SUMMARY OF THE INVENTION

It is, therefore, an object of the invention to provide an optical pickup system that is reduced in the number of parts and that is simplified in construction, thereby realizing cost reduction and higher production rate.

Another object of the invention is to provide a magnetooptical pickup system that can be easily changed to an operating mode for use with optical recording media other than magnetooptical ones.

According to a first aspect of the invention, there is provided an optical pickup system with which light emitted from a source to illuminate an optical recording medium is reflected so as to read information signals comprising a beam splitter; a photodetector; and a hologram device for splitting the emerging light from the source into a plurality of beams, the hologram device being an integral part of the entrance surface of the beam splitter.

According to a second aspect of the invention, there is provided an optical pickup system with which light emitted from a source to illuminate a magnetooptical recording medium is reflected so as to read information signals comprising: a beam splitter; a photodetector; and a polarizing separation device of a diffraction type for separating the reflected light from the magnetooptical recording medium into an ordinary and an extraordinary component, the polarizing separation device being an integral part of the surface of the beam splitter and being disposed on a side of the beam splitter which is closer to the photodetector.

According to a third aspect of the invention, there is provide an optical pickup system with which light emitted from a source to illuminate a magnetooptical recording medium is reflected so as to read information signals comprising: a beam splitter; a photodetector; a hologram device for splitting the emerging light from the source into a plurality of beams, the hologram device being an integral part of the entrance surface of the beam splitter; and a polarizing separation device of a diffraction type for separating the reflected light from the magnetooptical recording medium into an ordinary and an extraordinary component, the polarizing separation device being an integral part of the surface of the beam splitter and being disposed on a side of the beam splitter which is closer to the photodetector.

DETAILED DESCRIPTION OF THE PREFERRED EMBODIMENTS

Embodiments of the present invention will now be described with reference to accompanying drawings.

1st Embodiment

Figure 1:
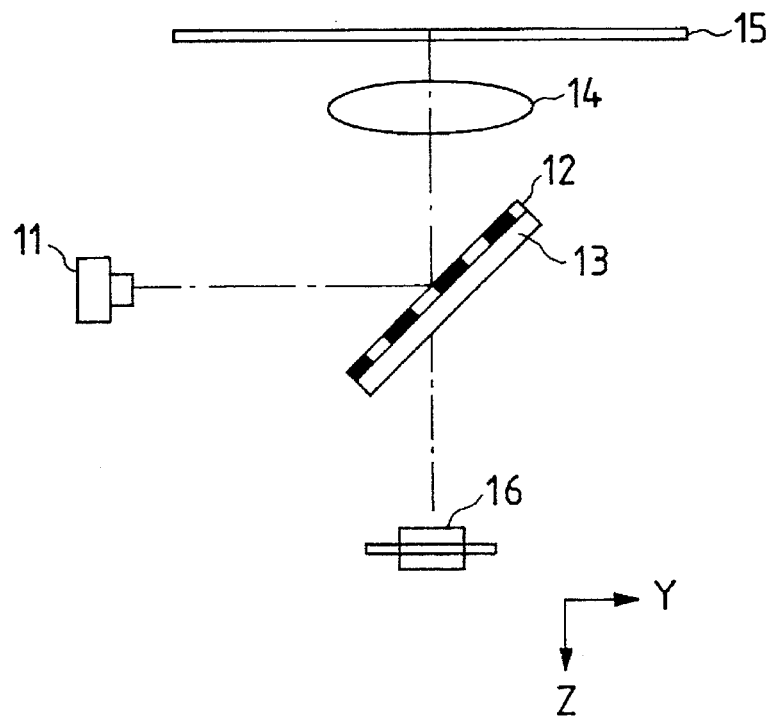
FIG. 1 shows schematically the basic construction of an optical pickup system according to a first embodiment of the invention.

FIG. 1 shows schematically the construction of an optical pickup according to a first example of the invention. As shown, the optical pickup has a semiconductor laser 11 as a light source and a hologram device 12 that is formed as an integral part of the entrance surface of a beam splitter 13 for splitting the emerging light beam from the laser 11 into a plurality of beamlets. Thus, the light beam issuing from the semiconductor laser 11 is split into a plurality of beamlets by means of hologram device 12 and the beamlets are directed to an objective lens 14 by means of beam splitter 13 so that they are focused to form a plurality of beam spots on the recording surface of an optical disk 15. The plurality of beam spots are individually reflected by the optical disk 15 to pass through the objective lens 14, hologram device 12 and beam splitter 13 again so that they are re-focused on the focal plane of the photodetector 16.

Figure 2:
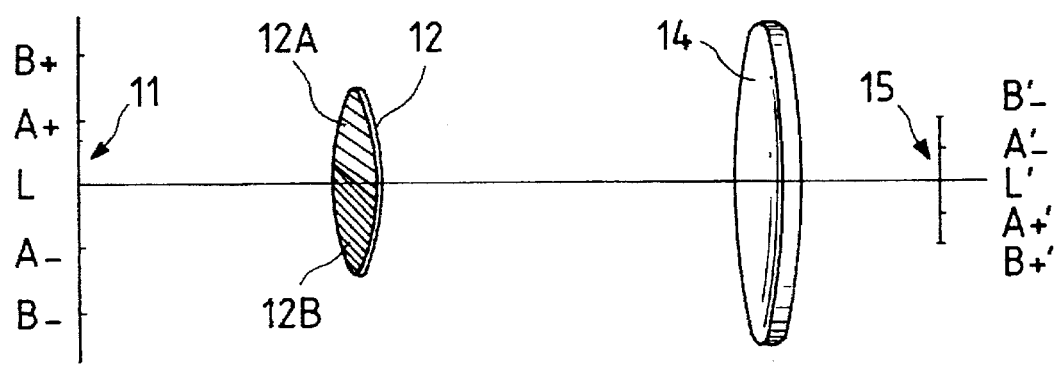
FIG. 2 shows the principle by which the hologram device in the optical pickup system shown in FIG. 1 allows a light beam to converge at a point on the recording surface of an optical disk.

As shown in FIGS. 2 and 4, the hologram device 12 is divided by a line CL that generally lies on the optical axis in a direction orthogonal to the tracks on the medium. The dividing line CL extends in such a way that diffracted light $A_+$, $A_-$, $B_+$ or $B_-$ (see FIG. 2) will align along the track 125 (see FIG. 3) at angles equivalent to or greater than the track width. In addition, the hologram device 12 has a pair of diffraction gratings that border on the dividing line CL and that have different conditions of diffraction from each other, namely, a first diffraction grating 12A and a second diffraction grating 12B that have the line spacing and direction varied in such a way that the condition of diffraction on one side of the dividing line CL differs from that on the other side. At least one of these diffraction gratings 12A and 12B has a capability for diffraction toward tracks.

The hologram device used in the embodiment under discussion is of the type shown in FIG. 4b but it should be noted that the effect to be described below will equally be attained by hologram devices of other types that are illustrated in FIGS. 4a, 4c, 4d and 4e.

The positions on the recording surface of the optical disk in which the zero-order beam which serves as a main beam for reading pit signals and the plus and minus first-order beams which serve as sub-beams for detecting focusing or tracking errors are focused by the action of hologram device 12 will now be discussed specifically with reference to FIG. 2 which illustrates the principle of the focusing operation. When a light beam issuing from the semiconductor laser 11 is launched into the upper diffraction grating 12A, the zero-order light passes undiffracted through the grating 12A and it is reflected by beam splitter 13 (not shown in FIG. 2) to be launched into objective lens 14 so that it is focused at point L'. On the other hand, the plus and minus components of the diffracted first-order light will be launched into the objective lens 14 as if they issued from virtual images $A_+$ and $A_-$ which are symmetrical with respect to the optical axis with the position L of semiconductor laser 11 lying in the center and the incident beams will be focused at points $A_+'$ and $A_-'$. Thus, the respective component of the light beam issuing from the diffraction grating 12A are made convergent by the objective lens 14 to be focused at the corresponding positions (conjugated points) on the recording surface; namely, the zero-order component is focused at point L' which is conjugated to point L, whereas the plus and minus first-order components are focused at points $A_+'$ and $A_-'$ which are conjugated to points $A_+$ and $A_-$, respectively.

The same explanation will apply to the light beam that issues from the semiconductor laser 11 to be launched into the lower diffraction grating 12B. Thus, the zero-order component is focused at point L' which is conjugated to point L whereas the plus and minus first-order components are focused at points $B_+'$ and $B_-'$ which are conjugated to points $B_+$ and $B_-$, respectively. As a result, the light issuing from the semiconductor laser 11 is processed by the upper and lower diffraction gratings 12A and 12B in the hologram device 12 to create the undiffracted zero-order beam and the diffracted plus and minus first-order beams, which are reflected by the beam splitter 13 to pass through the objective lens 14 so that they are focused to form spots on the recording surface of the optical disk 15 at five points, L', $A_+'$, $A_-'$, $B_+'$ and $B_-'$.

Figure 3:
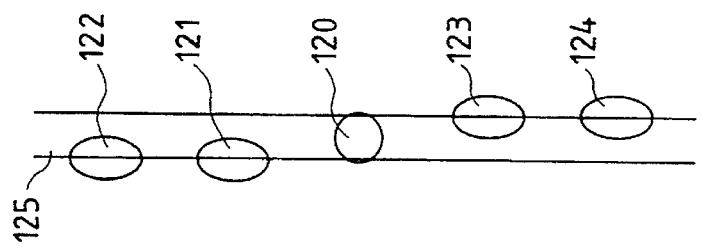
FIG. 3 is a plan view illustrating how the surface of the disk in the optical pickup system shown in FIG. 1 is illuminated with five beam spots.

FIG. 3 shows how these spots look like when viewed in a direction normal to the recording surface of the optical disk 15. Spot 120 focused at the center of track 125 derives from the undiffracted zero-order light and the four other spots 121–124 derive from the plus and minus components of the diffracted first-order light. Those light beams which have passed through the area of the hologram device 12 where no diffraction gratings are provided will be focused at the same spot as that derived from the undiffracted zero-order light. It should be noted that spots 121 and 123 derived from the plus and minus components of the diffracted first-order light through the upper diffraction grating 12A are symmetrical with respect to the central spot 120 and so are the spots 122 and 124 derived from the plus and minus components of the diffracted first-order light through the lower diffraction grating 12B. The plus and minus components of the diffracted first-order light that has passed through the diffraction gratings 12A and 12B can be focused at the appropriate positions on the track by specifying the line spacing and direction for each grating. The approximate shape of the spot derived from each of the plus and minus components of the diffracted first-order light is obtained as the Fourier transform of the numerical aperture of each grating.

Discussion will now be made of beam spots to be formed on the photodetector 16. The five spots on the recording surface of the optical disk 15 are reflected back from the disk to pass through the objective lens 14 again and all the beams that pass through the lens 14 are transmitted as the zero-order light component through the hologram device 12 and beam splitter 13 so that it is received by the photodetector 16.

The relative positions of the spots formed on the focal plane of the photodetector 16 satisfy conjugated relationships in the same as manner as discussed above for the five spots on the recording surface. Therefore, to pick up those five spots, the photodetector 16 consists of five light receiving elements 55, 56a/56b, 57a/57b, 58a/58b, 59a/59b as shown in FIG. 5.

If the position of the objective lens 14 relative to the optical disk 15 in the pickup system having the design layout described above is changed along the optical axis or in a direction normal thereto, the shape and position of each spot will change similarly on both the recording surface and the focal plane of the photodetector. The changes that occur to the beam spots on the photodetector 16 in response to defocusing, namely, the axial change in the position of the optical disk 15 as relative to the objective lens 14 will now be discussed with reference to FIG. 5.

Figure 5A:
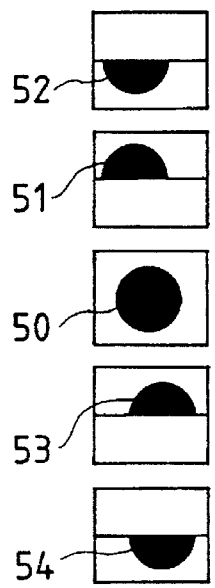
FIGS. 5(a)–5(c) illustrate how beam spots appear on the working surfaces of the light-receiving elements of the photodectector in the optical pickup system shown in FIG. 1.
Figure 5B:
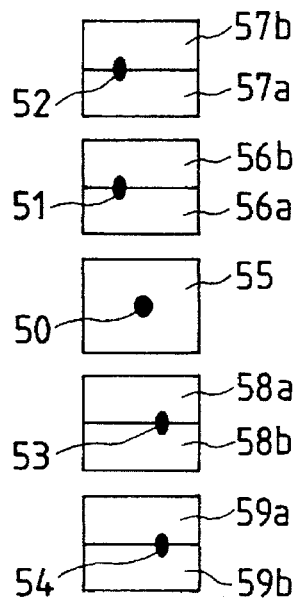

At FIG. 5b, the focus is correct and spot 50 derived from the zero-order beam is at the center; positioned on opposite sides of spot 50 are an upper spot 51 and a lower spot 53 which are derived from the plus and minus beams of the diffracted first-order light through the diffraction grating 12A, and positioned further upward and downward are spots 52 and 54, respectively, which are derived from the plus and minus beams of the diffracted first-order light through the diffraction grating 12B. All of those spots have a minimum diameter. It should also be noted here that spot 50 is located at the center of light-receiving element 55 whereas spots 51–54 derived from the diffracted plus and negative first-order beams have their centers located on the dividing lines of bisected light-receiving elements 56a/56b, 57a/57b, 58a/58b and 59a/59b which are aligned on opposite sides of the light-receiving element 55.

At FIG. 5a, the distance between objective lens 14 and optical disk 15 decreases and the spot 50 derived from the zero-order beam remains at the same position but increases in diameter whereas the spots 51 and 53 derived from the diffracted plus and minus first-order beams through the diffraction grating 12A increase in size to become similar to the shape of the aperture in the grating 12A as their center moves upward in FIG. 5, and spots 52 and 54 derived from the diffracted plus and minus first-order beams through the diffraction grating 12B also increase in size to become similar to the shape of the aperture in the grating 12B as their center moves downward in FIG. 5. As a result, spots 51–54 derived from the diffracted plus and minus first-order beams will deviate from the dividing lines of bisected light-receiving elements 56a/56b–59a/59b such that the greater part of each spot is located on one side of the dividing line. It should be noted that FIG. 5 shows the ideal state in which the spots 51–54 are located on only one side of the dividing lines but in practice those spots will partly lie on the other side because of blurs and other reasons.

Figure 5C:
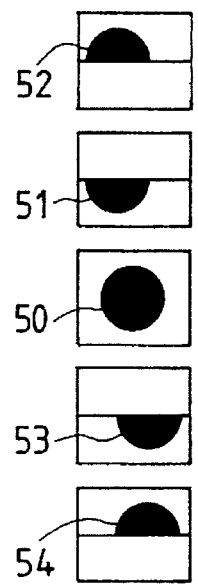

At FIG. 5c, the distance between objective lens 14 and optical disk 15 increases and the spot 50 derived from the zero-order beam also remains at the same position but increases in diameter whereas the spots 51 and 53 derived from the diffracted plus and minus first-order beams through the diffraction grating 12A increase in size to become similar to the inverted shape of the aperture in the grating 12A as their center moves downward in FIG. 5, and spots 52 and 54 derived from the diffracted plus and minus first-order beams through the diffraction grating 12B also increase in size to become similar to the inverted shape of the aperture in the grating 12B as their center moves upward in FIG. 5.

Figure 8:
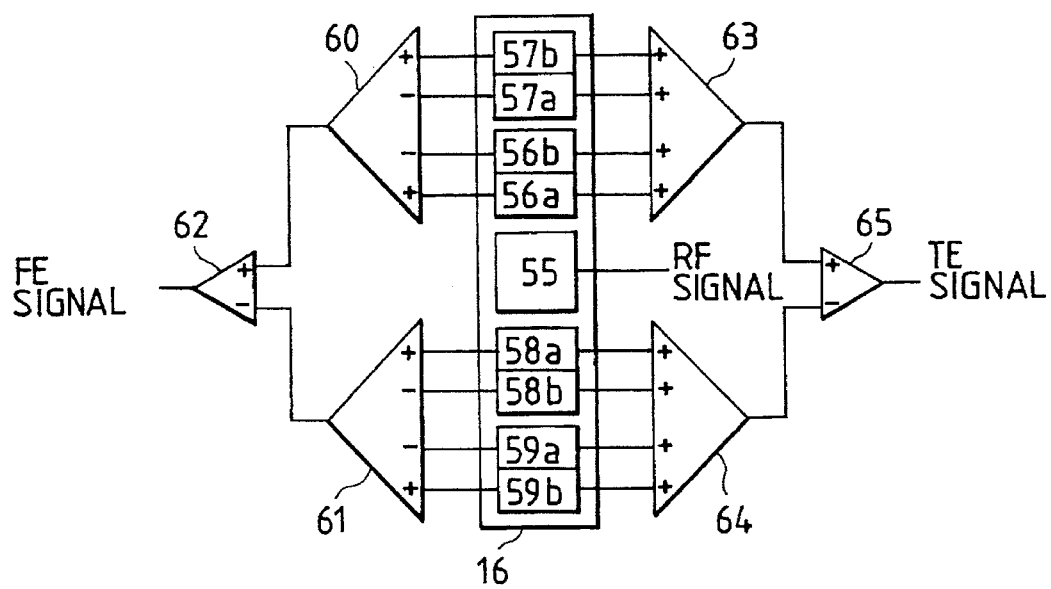
FIG. 8 shows a circuit wiring for producing a RF signal, a FE signal and a TE signal from the outputs of individual elements of the photodetector in the optical pickup system shown in FIG. 1.

Therefore, FE and TE signals can be obtained by processing the outputs of light-receiving elements 55, 56a/56b–59a/59b in the photodetector 16 through a circuit configuration as shown in FIG. 8. Stated more specifically, FE signals are obtained by comparing the outputs of 56a/56b and 57a/57b in a comparator 60 and the outputs of 58a/58b and 59a/59b in a comparator 61 (note the polarities of the inverting and non-inverting inputs of each comparator) and then feeding the results of comparisons to a comparator 62.

To detect tracking errors in the position of the optical disk 15 relative to the objective lens 14, the conventional three-spot method can be applied without any modification. As shown in FIG. 8, TE signals can be obtained by adding the outputs of 56a/56b and 57a/57b in an adder 63 and the outputs of 58a/58b and 59a/59b in an adder 64 and then feeding the result of additions to a comparator 65.

It should be noted that TE signals can also be obtained by processing either the combination of the outputs from 56a/56b and 58a/58b or the combination of the outputs from 57a/57b and 59a/59b.

As for RF signals, the diameter of the spot derived from the undiffracted zero-order beam changes with the degree of focusing but the spot is always located on the light-receiving element 55 in the photodetector 16. Therefore, not only the efficiency of utilization of that light-receiving element is enhanced but also the time of its adjustment is shortened to reduce the adjustment cost.

Thus, in the embodiment under consideration, hologram device 12 which splits the emerging light from semiconductor laser 11 into a plurality of beams is provided as an integral part of the entrance surface of beam splitter 13 such that the incident light beam going to the optical disk 15 is both split into a plurality of beamlets and separated from the light beam being reflected by the optical disk 15. Because of this design, not only the number of parts is reduced but also the overall system is simplified to reduce the time required in determining the layout and achieving the registry of individual parts, thereby realizing cost reduction and improved production rate.

In addition, the hologram device 12 is composed of two regions which border on the dividing line CL and which are adapted to have different conditions of diffraction from each other, so that tracking error signals as well as focus error signals are obtained from those components of the light (plus and minus first-order light) that have been diffracted with the device 12 whereas the undiffracted zero-order light component is used for the sole purpose of producing RF signals. Therefore, there is no need to use a divided photosensor to detect RF signals and even if there are changes in the spot diameter and position, the intensity of optical information signals will in no way change, thereby enabling the detection of signals having improved jitter characteristics.

Figures 4A, 4B, 4C, 4D, 4E:
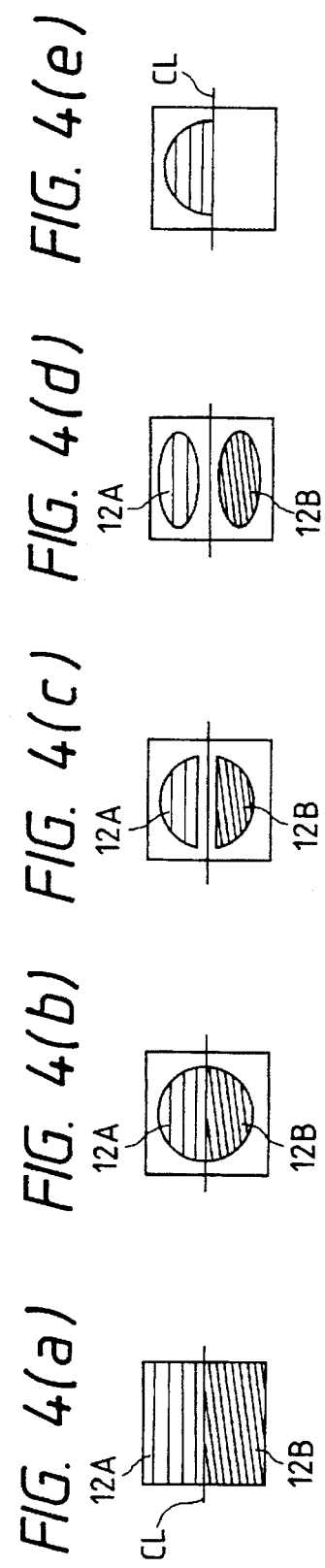
FIGS. 4(a)–4(e) show schematically various grating patterns that can be taken by the hologram device in the optical pickup system in FIG. 1.

FIG. 6 shows schematically various other grating patterns for use in the hologram device which is typically shown in FIG. 4a.

Figure 6A:
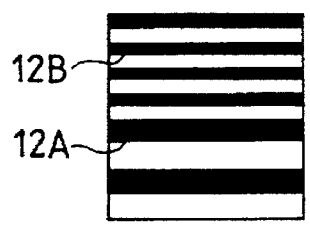
FIGS. 6(a)–6(e) show schematically other embodiments of the grating pattern that can be taken by the hologram device in the optical pickup system shown in FIG. 1.

The hologram device shown in FIG. 6a corresponds to the device 12 shown in FIG. 4a except that it is rotated through 180 degrees until the diffraction grating 12A shown in the upper part of FIG. 4a comes to the lower side whereas the diffraction grating 12B shown in the lower part of FIG. 4a comes to the upper side. This design is as effective as the above-described embodiment.

Figure 6B:
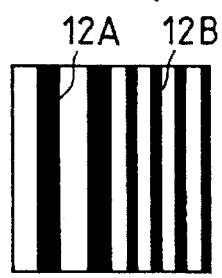

The hologram device shown in FIG. 6b also corresponds to the device 12 shown in FIG. 4a except that it is rotated counterclockwise through 90 degrees so the diffraction grating 12A shown in the upper part of FIG. 4a comes to the left side whereas the diffraction grating 12B shown in the lower part of FIG. 4a comes to the right side. The hologram device shown in FIG. 6c also corresponds to the device 12 shown in FIG. 4a except that it is rotated clockwise through 90 angles so that diffraction grating 12 shown in the upper part of FIG. 4a comes to the right side whereas the diffraction grating 12B shown in the lower side of FIG. 4a comes to the left side. With these designs, not only the semiconductor laser 11 and the beam splitter 13 but also the hologram device 12 need be rotated approximately 90 degrees about the optical axis through the objective lens 14 but needless to say they are as effective as the above-described embodiment.

Figure 6C:
Figure 6D:
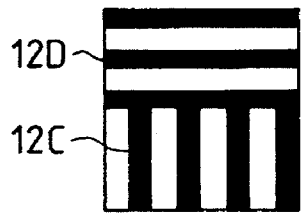
Figure 6E:
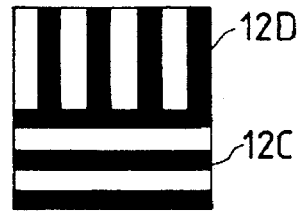
Figure 7:
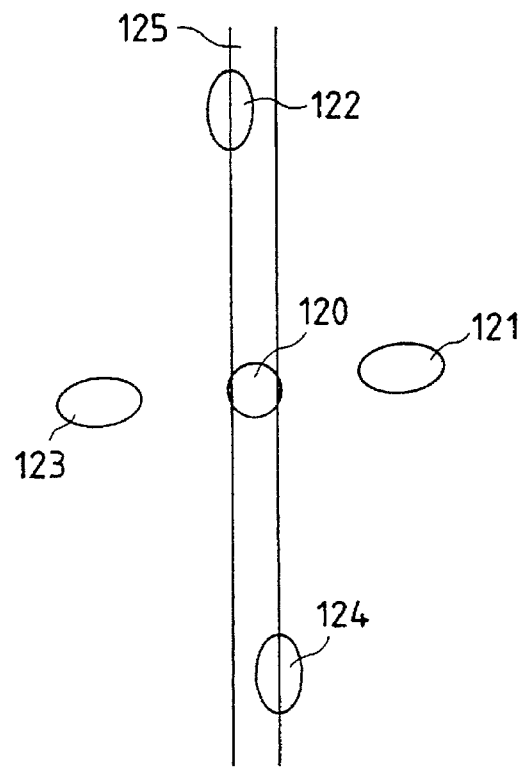
FIG. 7 is a plan view illustrating how the surface of an optical disk is illuminated with five beam spots that have been produced by the hologram device having the grating pattern shown in FIG. 6d or 6e.

The hologram device shown in FIG. 6d is divided into two regions by a line that generally lies on the optical axis in a direction orthogonal to the tracks on the recording medium. Another feature of the hologram device shown in FIG. 6d is that the lines forming the grating 12C are substantially orthogonal to the lines forming the grating 12D. The hologram device shown in FIG. 6e is the same as what is shown in FIG. 6d except that it is turned through 180 degrees. With the design, the line connecting spots 121 and 123 formed on the recording surface of the optical disk 15 which are derived from the diffracted plus and minus first-order beams to spot 120 which is derived from the undiffracted zero-order beam is substantially orthogonal to the line connecting spots 122 and 124 also formed on the recording surface of the optical disk 15 which are derived from the diffracted plus and minus first-order beams to the spot 120; since the photodetector is be fabricated to this arrangement, the overall size of the system can be made smaller than in the case where other types of hologram-producing devices are employed.

In the foregoing description, the photodetector 16 is so designed that all of the light-receiving elements lie in the same plane (the plane of the paper) but it should be noted that by changing the grating pattern of the hologram device 12, the light-receiving elements may be adapted to lie in a direction normal to the plane of the paper or, alternatively, both in the plane of the paper and in a direction normal thereto.

It should also be noted that in FIGS. 6a–6c, the lines forming the diffraction gratings 12A and 12B in the hologram device are drawn to be parallel to one another but in practice they extend in slightly different directions.

In this connection, at least one of the diffraction gratings which border on the dividing line of each of the above-described hologram devices may be adapted to have a grating pattern of curves. This is effective in allowing the sub-beams to form a correctly focused image on the optical disk 15, which contributes a further improvement in the precision of the final product. The grating pattern used in this case reflects the difference between the two phases of a light beam at the reflecting surface of beam splitter 13, one for the case where the semiconductor laser 11 is considered as a point source and the other for the case where the conjugated point, on the laser side, of a sub-beam on the optical disk 15 is considered as a point source.

2nd Embodiment

Figure 9:
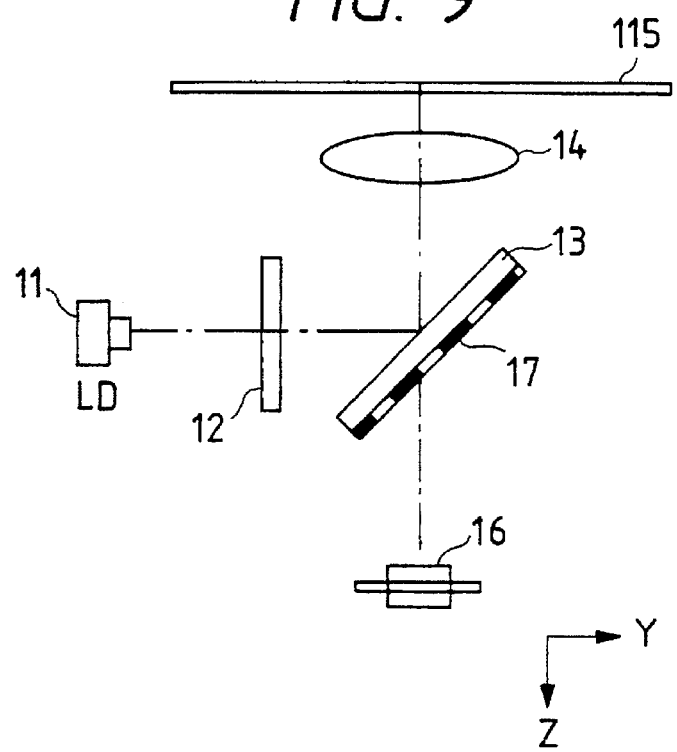
FIG. 9 shows a schematically the basic construction of a magnetooptical pickup system according to a second embodiment of the invention.
Figure 10:
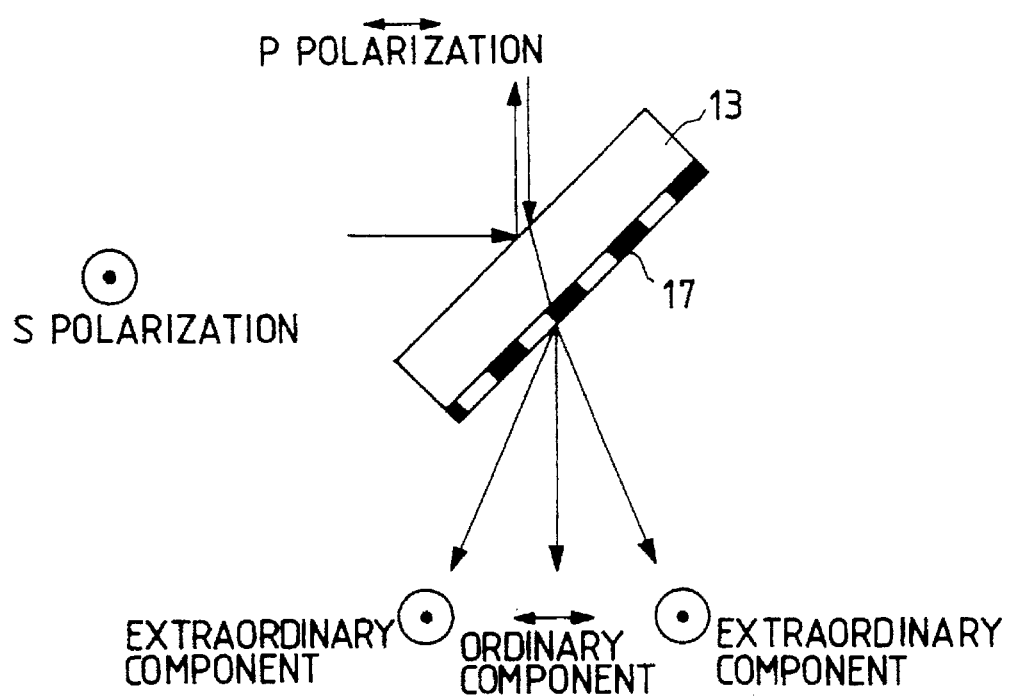
FIG. 10 is a side view showing enlarged the beam splitter and the polarizing separation device that are used in the magnetooptical pickup system shown in FIG. 9.

We will now describe a second embodiment of the invention. FIG. 9 shows schematically the basic construction of a magnetooptical pickup according to the second embodiment of the invention, and FIG. 10 is a side view showing enlarged a beam splitter 13 and a polarizing separation device 17 used in the pickup. The pickup according to the second embodiment of the invention is so constructed that the beam of light (which is S-polarized) issuing from the semiconductor laser 11 as a source is split into a plurality of beamlets by means of the hologram device 12 and the beamlets are directed through the beam splitter 13 to be launched into the objective lens 14 which focuses them to form a plurality of beam spots on the recording surface of a magnetooptical disk 15. The plurality of beam spots are individually reflected by the magnetooptical disk 15 to pass through the objective lens 14, beam splitter 13 and polarizing separation device 17 again so that they are refocused on the focal plane of the photodetector 16.

As in the first embodiment, the hologram device 12 used in the second embodiment has a pair of diffraction gratings that border on the dividing line CL and that have different conditions of diffraction from each other (see FIGS. 2 and 4).

The structurally characteristic part of the second embodiment is that the polarizing separation device 17 which separates the reflected light from the magnetooptical disk 15 into an ordinary component and an extraordinary component is formed as an integral part of the surface of the beam splitter 13 which is closer to the photodetector 16 (which is shown at lower right in FIG. 9).

Figure 11:
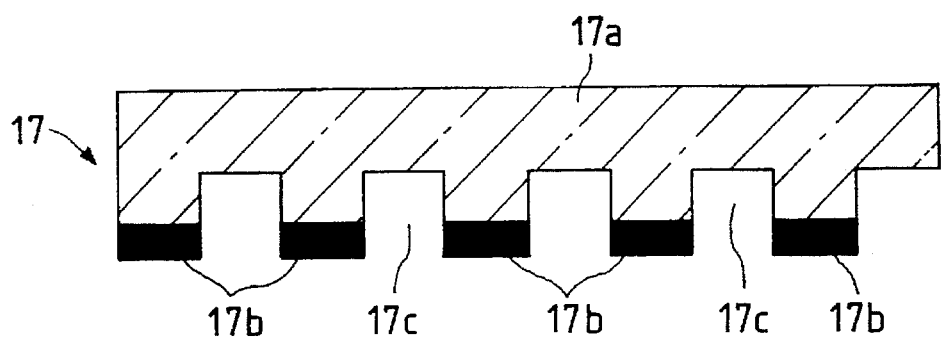
FIG. 11 is a cross section showing enlarged the polarizing separation device used in the magnetooptical pickup system shown in FIG. 9.

The polarizing separation device 17 may adopt various known structures as described in Japanese Patent Publication (Kokai) Sho. 63-314502, Sho. 63-262602 and Sho. 63-262604. An exemplary construction is shown in FIG. 11 and comprises an optically isotropic substrate 17a typically made of glass which is coated with a birefringent film 17b and provided with a periodic pattern of linear ridges and grooves 17c. The grating line may take on any direction but in the second embodiment they extend parallel to the direction of S polarization.

The component of light polarized by the birefringent film 17b in the direction of its orientation (parallel to the optical axis) is an extraordinary component whereas the component polarized in a direction normal to the orientation is an ordinary component. In the polarizing separation device 17 used in the second embodiment, the thickness of the birefringent film 17b and the depth of grooves in the substrate 17 are so set that all ordinary components are undiffracted (zero-order light) whereas all extraordinary components are diffracted (plus and minus first-order light). If desired, however, those parameters may be set such that all extraordinary components are undiffracted (zero-order light) whereas all ordinary component are diffracted (plus and minus first-order light).

Figure 12:
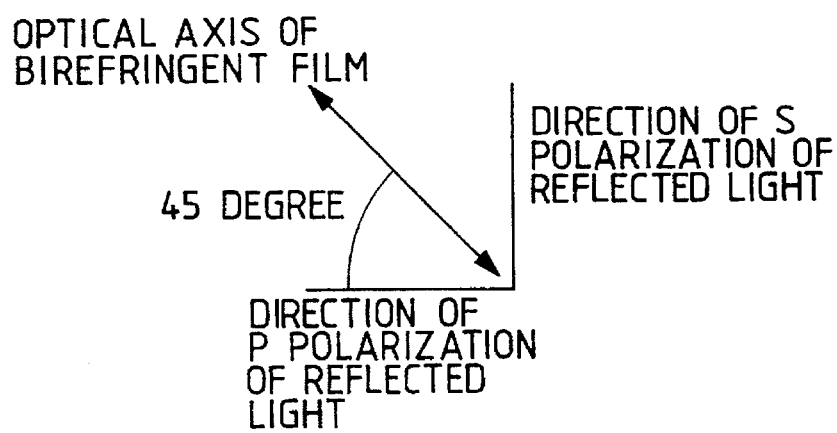
FIG. 12 illustrates the direction of orientation of the birefringent film in the polarizing separation device shown in FIG. 9.

Another feature of the second embodiment is that the orientation of the birefringent film 17b (parallel to the optical axis) is inclined by 45 degrees to each of the directions of P and S polarizations (see FIG. 12) so that differential detection can be performed to improve the accuracy of detection of magnetooptical signals (MOS).

In the second embodiment, the light-receiving elements that compose the photodetector 16 consist of three groups 31, 32 and 33. The elements of group 31 will receive the ordinary components of light that has passed through the polarizing separation device 17 and those of grooves 32 and 33 will receive the extraordinary components. Thus, the elements of group 31 are arranged in such a way as to receive the zero-order light that has passed undiffracted through the polarizing separation device 17, whereas the elements of groups 32 and 33 are arranged in such a way as to receive the plus and minus components of the first-order light which has been diffracted by passage through the device 17.

Figure 13:
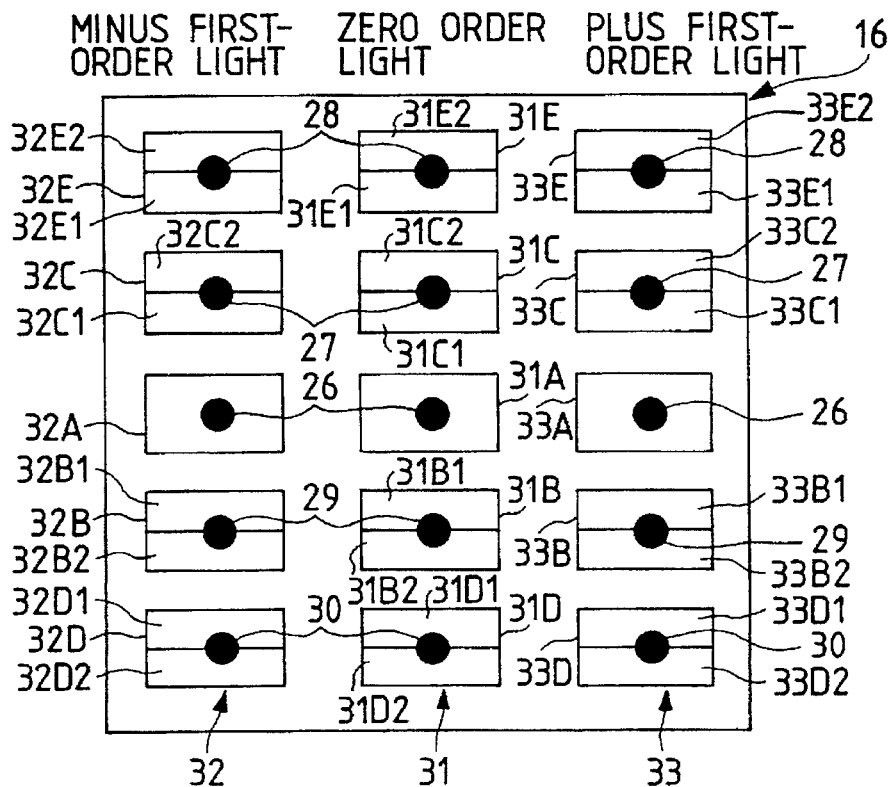
FIG. 13 is a plan view illustrating the layout of the light-receiving elements of the photodetector shown in FIG. 9.

The relative positions of the spots formed on the focal plane of the photodetector 16 satisfy conjugated relationships in the same manner as discussed above for the five spots on the recording surface. Therefore, to pick up those five spots, each of the groups 31, 32 and 33 consists of five light-receiving elements that are arranged side by side as shown in FIG. 13, with the central element in each group being tagged with suffix A, the elements on opposite sides of the central element tagged with suffixes B and C, and the elements on opposite sides of but farther from the central element being tagged with suffixes D and E. All elements except the centrally positioned 31A, 32A and 33A are divided into two portions, one being positioned inward (closer to the center) and the other being positioned outward.

Stated more specifically, the light-receiving elements of groups 31, 32 and 33 are so arranged that the centrally positioned elements 31A, 32A and 33A will receive the undiffracted light (zero-order light) from the hologram device 12 whereas the elements 31B, 31C, 32B, 32C, 33B and 33C which are positioned on opposite sides of these central elements will receive the plus and minus components of the first-order light which has been diffracted by the first grating A in the device 12 and the elements 31D, 31E, 32D, 32E, 33D and 33E which are positioned on opposite sides of but farther from the central elements will receive the plus and minus components of the first-order light which has been diffracted by the second grating B in the device 12.

The position and shape of the spot formed on each of the light-receiving elements are such that they will change similarly on both the recording surface and the focal plane of the photodetector if the position of the objective lens 14 relative to the magnetooptical disk 115 is changed along the optical axis or in a direction normal thereto. The changes that occur to the beam spots on the photoreceptor 16 in response to defocusing, namely, the axial change in the position of the objective lens 14 as relative to the magnetooptical disk 115 will now be described with reference to FIG. 14.

Figures 14A, 14B, 14C:
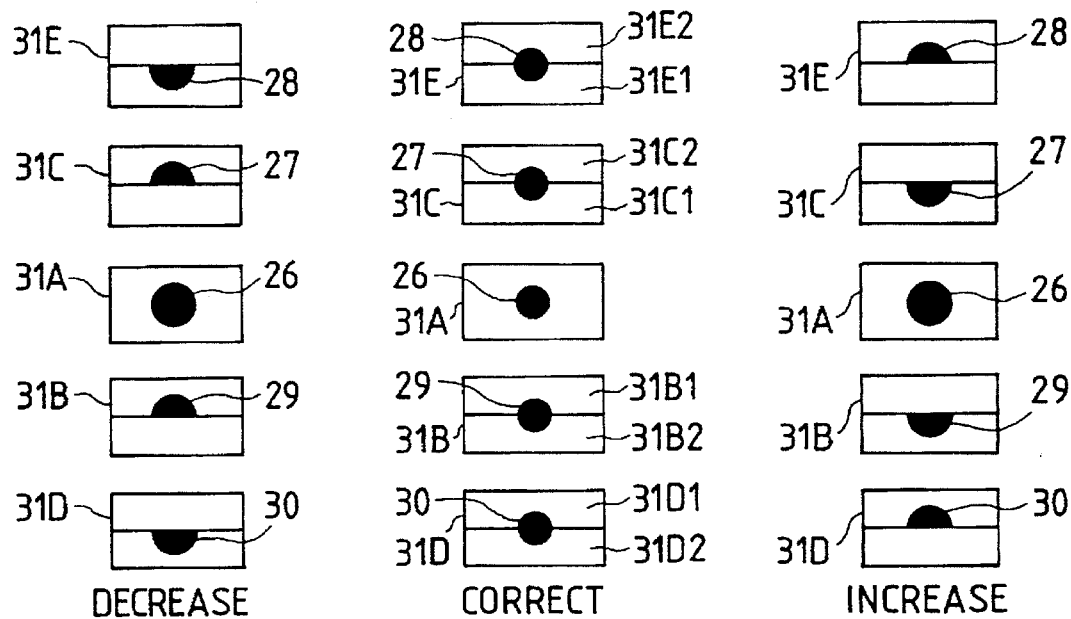
FIGS. 14(a)–14(c) illustrate how beam spots change on the effective surfaces of the light-receiving elements shown in FIG. 13 depending on the degree of focusing.

At FIG. 14b, the focus is correct and spot 26 derived from the zero-order beam is at the center; positioned on opposite sides of spot 26 are an upper spot 27 and a lower spot 29 which are derived from the plus and minus beams of the diffracted first-order light through the diffraction grating 12A, and positioned further upward and downward are spots 28 and 30, respectively, which are derived from the plus and minus beams of the diffracted first-order light through the diffraction grating 12B. All of those spots have a minimum diameter. It should also be noted here that spot 26 is located at the center of light-receiving element 31A whereas spots 27–30 derived from the diffracted plus and negative first-order beams have their centers located on the dividing lines of bisected light-receiving elements 31B, 31C, 31D and 31E which are aligned on opposite sides of the light-receiving element 31A.

At FIG. 14a, the distance between objective lens 14 and optical disk 115 decreases and the spot 26 derived from the zero-order beam remains at the same position but increases in diameter whereas the spots 27 and 29 derived from the diffracted plus and minus first-order beams through the diffraction grating 12A increase in size to become similar to the shape of the aperture in the grating 12A as their center moved upward in FIG. 14, and spots 28 and 30 derived from the diffracted plus and minus first-order beams through the diffraction grating 12B also increase in size to become similar to the shape of the aperture in the grating 12B as their center moves downward in FIG. 14. As a result, spots 27–30 derived from the diffracted plus and minus first-order beams will deviate from the dividing lines of bisected light-receiving elements 31B–31E such that the greater part of each spot is located on one side of the dividing line. It should be noted that FIG. 14 shows the ideal state in which the spots 27–30 are located on only one side of the dividing lines but in practice those spots will partly lie on the other side because of blurs and other reasons.

At FIG. 14c, the distance between objective lens 14 and optical disk 15 increases and the spot 26 derived from the zero-order beam also remains at the same position but increases in diameter whereas the spots 27 and 29 derived from the diffracted plus and minus first-order beams through the diffraction grating 12A increase in size to become similar to the inverted shape of the aperture in the grating 12A as their center moves downward in FIG. 14, and spots 28 and 30 derived from the diffracted plus and minus first-order beams through the diffraction grating 12B also increase in size to become similar to the inverted shape of the aperture in the grating 12B as their center moves upward in FIG. 14.

It should also be noted that the spots formed on the elements groups 32 and 33 also change as shown in FIG. 14a, 14b and 14c due to defocusing.

Therefore, by synthesizing the output signals from the respective light-receiving elements 31, 32 and 33 and comparing the synthesized signals, three different signals, a magnetooptical signal (MOS), a focus control signal (FES) and a tracking control (TES), are provided. Stated more specifically, a focus control signal (FES) is obtained in the following manner:

$$FES = \\ (31B2 + 31C1 + 31D1 + 31E2) - (31B1 + 31C2 + 31D2 + 31E1) + \\ (32B2 + 32C1 + 32D1 + 32B2) - (32B1 + 32C2 + 32D2 + 32E1) + \\ (33B2 + 33C1 + 33D1 + 33B2) - (33B1 + 33C2 + 33D2 + 33E1)$$

Suffix "1" is used to signify light-receiving elements positioned inward and suffix "2" to signify those positioned outward.

A tracking control signal (TES) is obtained as follows:

$$TES = \\ (31B2 + 31B2 + 31D1 + 31D2) - (31C1 + 31C2 + 31E1 + 31E2) + \\ (32B1 + 32B2 + 32D1 + 32D2) - (32C1 + 32C2 + 32E1 + 32E2) + \\ (33B1 + 33B2 + 33D1 + 33D2) - (33C1 + 33C2 + 33E1 + 33E2)$$

or $$TES = (31B1 + 31B2) - (31C1 + 31C2) + \\ (32B1 + 32B2) - (32C1 + 32C2) + (33B1 + 33B2) - (33C1 + 33C2)$$

or $$TES = (31D1 + 31D2) - (31E1 + 31E2) + \\ (32D1 + 32D2) - (32E1 + 32E2) + (33D1 + 33D2) - (33E1 + 33E2)$$

A magnetooptical signal (MOS) is obtained as follows:

$$MOS = (31A + 31B + 31C + 31D + 31E) - \\ (32A + 32B + 32C + 32D + 32E + 33A + 33B + 33C + 33D + 33E)$$

Thus, in the magnetooptical pickup according to the second embodiment of the invention, the light beam going toward the recording medium and the beam reflected by the medium are separated by means of the integral combination of the beam splitter 13 and the polarizing separation device 17 and the separated beam of the reflected light is further separated into an ordinary and an extraordinary component so that the desired pieces of information can be obtained by detecting the thus separated ordinary and extraordinary components.

Since the polarizing separation device 17 is an integral part of the beam splitter 13, they can be removed from the optical path as a unit so that any other suitable device such as a different type of beam splitter is inserted into the optical path to perform operational switching from one pickup system to another. In other words, the operation of a magnetooptical pickup can be easily switched to that of an optical pickup for handling information that consists of pit train as on CDs.

Producing the necessary signals (MOS, FES and TES) in the manner describe above offers another advantage in that even if the wavelength of the light source varies to cause changes in the angles of diffraction of the plus and minus first-order light beams, the resulting variations in the outputs of the associated bisected light-receiving elements can be effectively canceled out. It should also be noted that the diameter of the spot derived from the undiffracted zero-order beam changes with the degree of focusing but the spot is always located on the light-receiving elements 31A, 32A and 33A in the photodetector 16. Therefore, the efficiency of utilization of light is sufficiently enhanced.

3rd Embodiment

Figure 15:
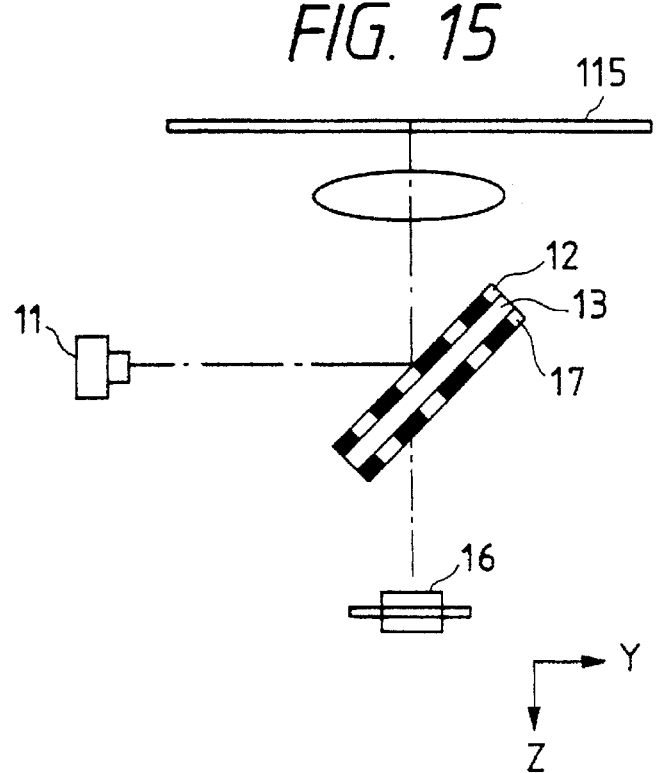
FIG. 15 shows schematically the basic construction of a magnetooptical pickup system according to a third embodiment of the invention.
Figure 16:
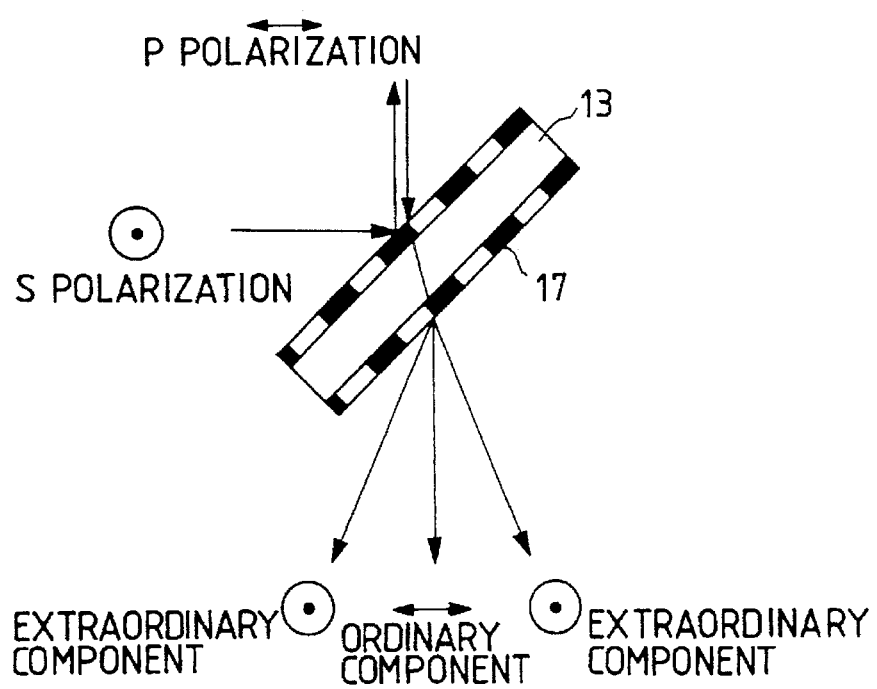
FIG. 16 is a side view showing enlarged the hologram beam splitter and the polarizing separation device which are used in the magnetooptical pickup system shown in FIG. 15.

We will now describe a third embodiment of the invention. FIG. 15 shows schematically the basic construction of a magnetooptical pickup according to the third embodiment of the invention and FIG. 16 is a side view showing enlarged a beam splitter 13, a hologram device 12 and a polarizing separation device 17 used in the pickup. In this pickup system, the hologram device 12 which is of the same type as described for the first embodiment and which splits the emerging light from the semiconductor laser 11 into a plurality of beams is formed as an integral part of the entrance surface of the beam splitter 13 and, in addition, the polarizing separation device 17 of the same type as described for the second embodiment and which separates the reflected light from the magnetooptical disk 115 into an ordinary and an extraordinary component is formed as an integral part of the surface of the beam splitter 13 which is closer to the photodetector 16.

The functions to be performed by the hologram device 12 and the polarizing separation device 17 were already described above. In the third embodiment, they are so adapted that the incident light beam going to the magnetooptical disk 115 is both split into a plurality of beamlets and separated from the light beam being reflected by the magnetooptical disk 115, with the reflected beam being further separated into an ordinary and an extraordinary component. Because of this design, not only the number of parts is reduced but also the overall system is simplified to reduce the time required in determining the layout and achieving the registry of individual parts, thereby realizing cost reduction and improved production rate.

Figure 17A:
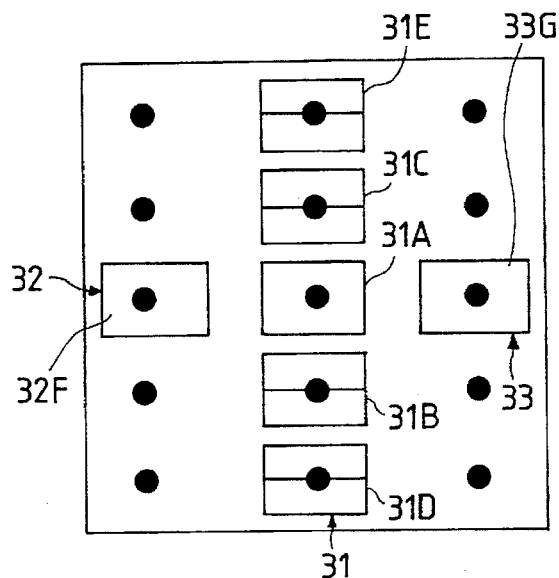
FIGS. 17(a) and 17(b) are plan views illustrating another embodiment of the light-receiving elements of the photodetector shown in FIG. 15.
Figure 17B:
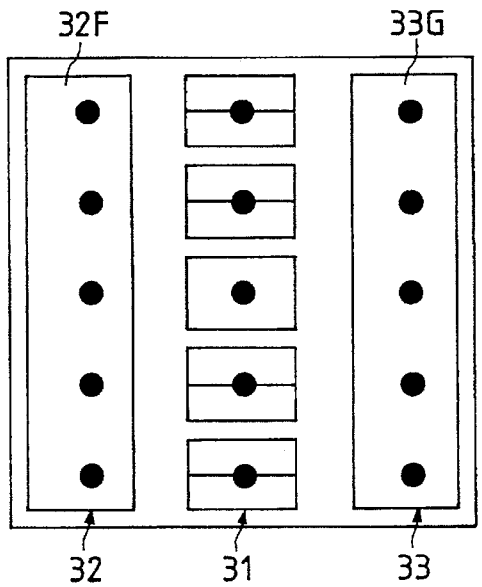

We will now describe another embodiment of the light-receiving elements which compose the photodetector 16 shown in FIG. 15. In the embodiment shown in FIG. 17, the group of elements indicated by 31 for receiving an ordinary component of light is composed in the same way as described for the second embodiment with reference to FIG. 13 and the groups 32 and 33 for receiving an extraordinary component of light are composed of a single light-receiving element 32F or 33G, respectively. The embodiment shown in FIG. 17a is so adapted that a single beam spot derived from the undiffracted (zero-order) light through the hologram device 12 will illuminate the elements 32F and 33G, and the embodiment shown in FIG. 17b is so adapted that a total of five beam spots derived not only from the zero-order light but also from the plus and minus first-order beams through the hologram device 12 will illuminate the elements 32F and 33G.

In the embodiment just described above, a focus control signal (FES) is obtained as:

$$FES=(31B2+31C1+31D1+31E2)-(31B1+31C2+31D2+31E1)$$

A tracking control signal (TES) is obtained as:

$$TES=(31B1+31B2+31D1+31D2)-(31C1+31C2+31E1+31E2)$$

or $$TES=(31B1+31B2)-(31C1+31C2)$$

or $$TES=(31D1+31D2)-(31E1+31E2)$$

A magnetooptical signal (MOS) is obtained as follows in the case of FIG. 17a:

$$MOS=31A-(32F+33G)$$

$$MOS = (31B1 + 31B2 + 31C1 + 31C2 + 31D1 + 31D2 + 31E1 + 31E2) - (32F + 32G)$$

Figure 18A:
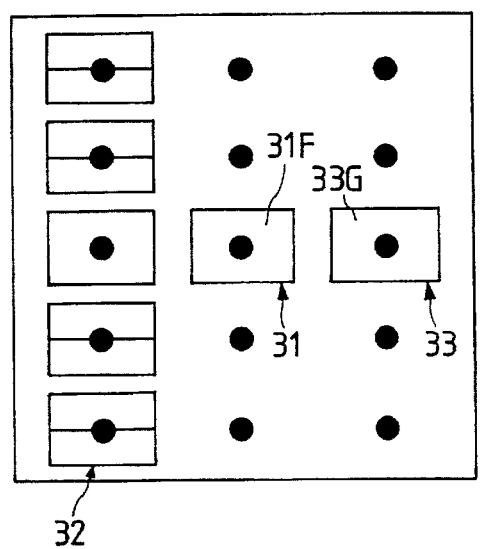
FIGS. 18(a) and 18(b) are side views illustrating still another embodiment of the light-receiving elements of the photodectector shown in FIG. 15.
Figure 18B:
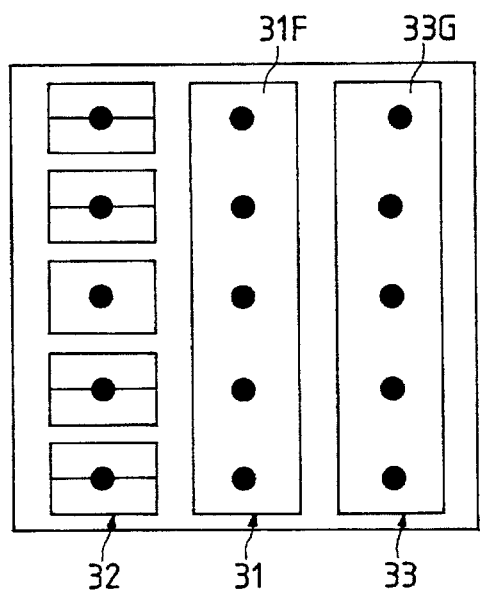

Yet another embodiment of the light-receiving elements is shown in FIG. 18. In that embodiment, the group 32 for receiving an extraordinary component of light is composed in the same way as described in the second embodiment, with reference to FIG. 13; in addition, the group 31 for receiving an ordinary component and the second group 33 for receiving an extraordinary component are composed of a single light-receiving element 31F or 33G, respectively. The embodiment shown in FIG. 18a is so adapted that a single beam spot derived from the undiffracted (zero-order) light through the hologram device 12 will illuminate the elements 31F and 33G, and the embodiment shown in FIG. 18b is so adapted that a total of five beam spots derived not only from the zero-order light but also from the plus and minus first-order beams through the hologram device 12 will illuminate the elements 31F and 33G.

In the embodiment just described above, a focus control signal (FES) is obtained as:

$$FES=(32B2+32C1+31D1+31E2)-(32B1+32C2+32D2+32E1)$$

A tracking control signal (TES) is obtained as:

$$TES=(32B1+32B2+32D1+32D2)-(32C1+32C2+32E1+32E2)$$

or $$TES=(32B1+32B2)-(32C1+32C2)$$

or $$TES=(32D1+32D2)-(32E1+32E2)$$

A magnetooptical signal (MOS) is obtained as follows in the case of FIG. 18a:

$$MOS=31F-(32A+33G)$$

and in the case of FIG. 18b, MOS is obtained as:

$$MOS = (31F) - (32A + 32B1 + 32B2 + 32C1 + 32C2 + 32D1 + 32D2 + 32E1 + 32E2 + 33G)$$

Figure 19:
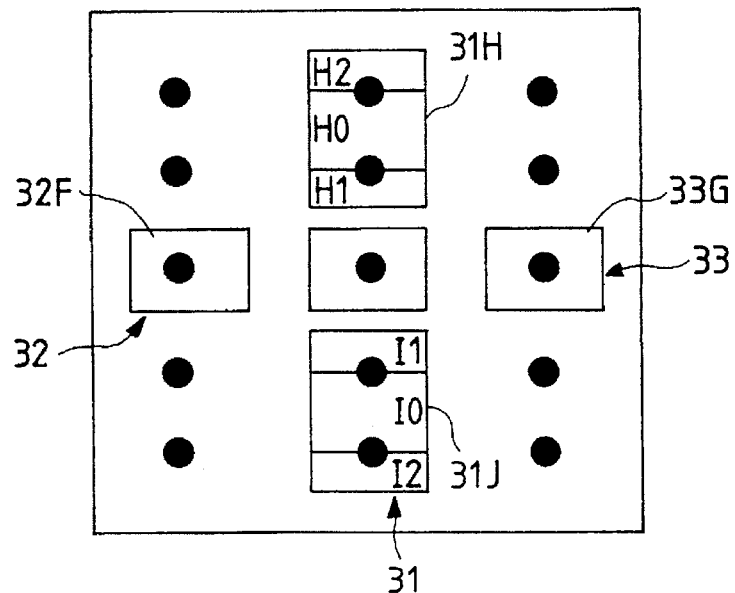
FIG. 19 is a side view illustrating a further embodiment of the light-receiving elements of the photodetector shown in FIG. 15.
Figure 20:
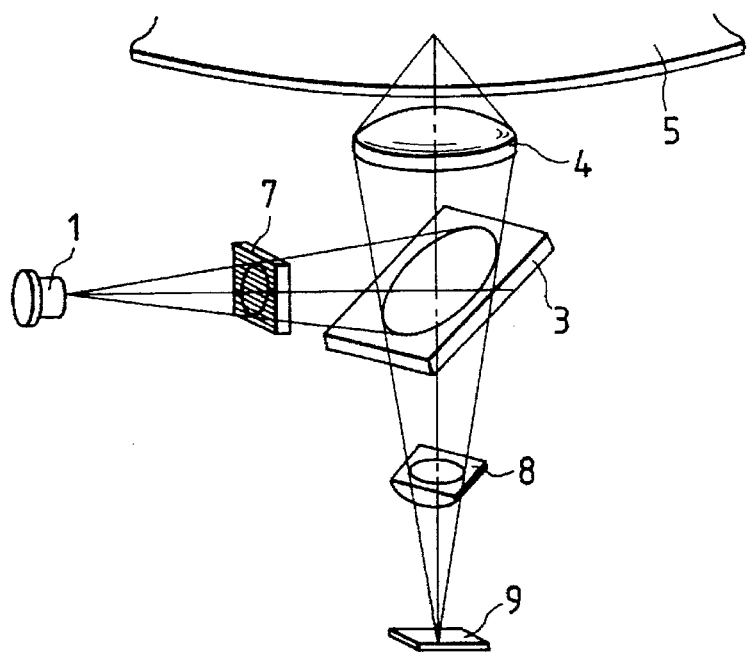
FIG. 20 shows schematically the basic construction of a prior art optical pickup system.
Figure 21:
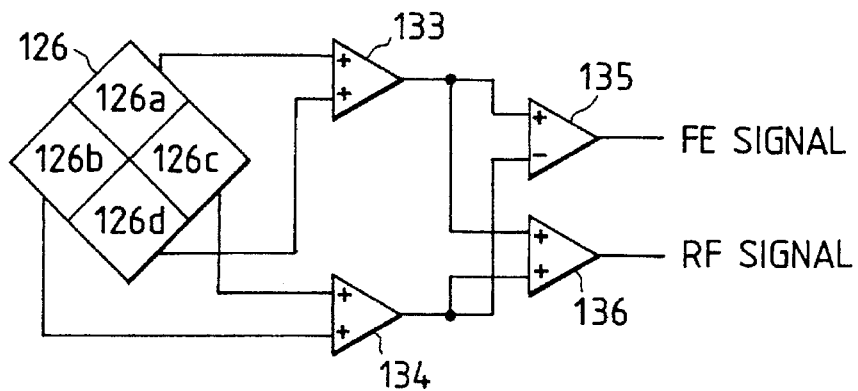
FIG. 21 illustrates a circuit wiring for the outputs of a prior art quadrant photodetector.
Figure 22:
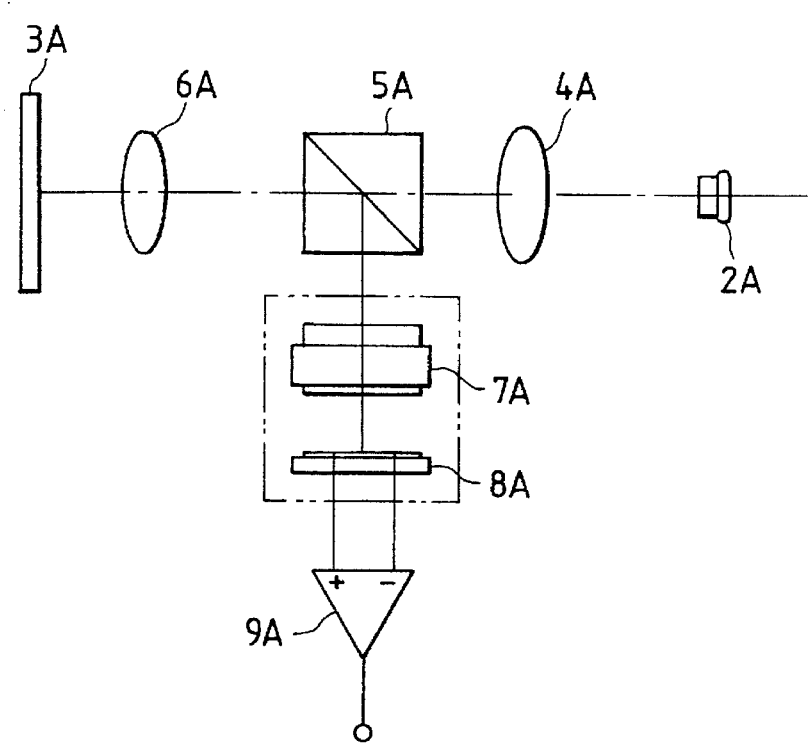
FIG. 22 shows schematically the basic construction of a prior art magnetooptical pickup system.

A further embodiment of the light-receiving elements is shown in FIG. 19. In that embodiment, that portion of the group 31 for receiving an ordinary component of light is composed of two three-part elements 31H and 31J which are intended to receive the plus and minus first-order beams from the hologram device 12 and the groups 32 and 33 for receiving an extraordinary component are composed of a single light-receiving element 32F or 33G, respectively. The embodiment under consideration is so adapted that a single beam spot derived from the undiffracted (zero-order) light through the hologram device 12 will illuminate the elements 32F and 33G.

In the embodiment Just described above, a focus control signal (FES) is obtained as:

$$FES=(31H1+31H2+31J0)-(31J1+31J2+31H0)$$

A tracking control signal (TES) is obtained as:

$$TES=(31J1+31J2+31J0)-(31H1+31H2+31H0)$$

A magnetooptical signal (MOS) is obtained as:

$$MOS=31A-(32F+33G)$$

The embodiments of photodetector 16 shown in FIGS. 17–19 are as effective as the embodiment already described with reference to FIG. 13. The optical axis of the polarizing separation device 17 may be set independently of the direction of grating lines but if it is so set that it rotates approximately 45 degrees about the optical axis of the light returning from the magnetooptical disk, an output magnetooptical signal can be detected in a differential and hence consistent manner. In all the embodiments described hereinabove, a diffraction grating is used as the hologram device but holograms having a capability for diffraction toward the tracks can equally be employed.

As described on the foregoing pages, the invention provides an optical pickup system which is so constructed that a hologram device for splitting the emerging light from a source into a plurality of beams is provided as an integral part of the entrance surface of a beam splitter so that the incident light beam going to a recording medium is split into a plurality of beamlets and separated from the beam of light being reflected by the medium. With this design, not only the number of parts is reduced and the overall system is simplified but also a compact pickup system is realized and the time required in determining the layout and achieving the registry of individual parts is shortened, thereby realizing cost reduction and improved production rate.

The invention also provides a magnetooptical pickup system which is so constructed that a polarizing separation device for separating the reflected light from a magnetooptical recording medium into an ordinary and an extraordinary component is provided as an integral part of the surface of a beam splitter which is closer to a photodetector, so that the beam of light going to the magnetooptical recording medium is separated from the reflected beam, which is further separated into an ordinary and an extraordinary component. This design realizes a simple system that can be produced with a higher efficiency. As another advantage, the unitary combination of the beam splitter and the polarizing separation device can be readily removed from the optical path so that another beam splitter is inserted into the optical path and this insures that the operation of the magnetooptical pickup system can be easily switched to that of a different type of optical pickup that handles information consisting of pit trains as on CDs. Thus, the magnetooptical pickup system of the invention proves very useful in commercial applications.

The invention further provides a magnetooptical pickup system which is so constructed that a hologram device for splitting the emerging light from a source into a plurality of beams is provided as an integral part of the entrance surface of a beam splitter while a polarizing separation device for separating the reflected light from a magnetooptical recording medium into an ordinary and an extraordinary component is provided as an integral part of the surface of the beam splitter which is closer to a photodetector, so that the incident light beam going to the magnetooptical recording medium is split into a plurality of beamlets and separated from the reflected beam, which is further separated into an ordinary and an extraordinary component. With this design, not only the number of parts is reduced and the overall system is simplified but also a compact pickup system is realized and the time required in determining the layout and achieving the registry of individual parts is shortened, thereby realizing cost and improved production rate.

In each of the optical pickup systems described above, the hologram device may be so adapted that it consists of at least two regions that border on a dividing line and that have different conditions of diffraction from each other. If this is the case, a tacking error signal and a focus error signal can be obtained from those components of the light (plus and minus first-order light) which have been diffracted by the hologram device whereas the undiffracted zero-order light component can be used for the sole purpose of producing RF signals, allowing a solid (unsegmented) photodetector to be used for detecting such RF signals. This helps totally eliminate the adverse effect of the dead zones of sensing elements and even if there are changes in the spot diameter and position, the intensity of optical information signal will in no way change, thereby enabling the detection of signals having improved jitter characteristics.

If desired, at least one of the diffraction gratings in the hologram device which border on the dividing line may be adapted to have a grating pattern of curves. This is effective in allowing sub-beams to form a correctly focused image on the recording medium, which contributes a further improvement in the precision of the final product.

Further in addition, the optical axis of the polarizing separation device may be so set that it rotates approximately 45 degrees about the optical axis of the reflected light from the magnetooptical recording medium with respect to the polarization of the reflected light and this enables magnetooptical signals to be detected in a differential and hence consistent manner without being substantially affected by noise.

What is claimed is:

1. An optical pickup system with which light emitted from a source to illuminate a magnetooptical recording medium is reflected so as to read information signals comprising:

a beam splitter;

a photodetector;

a hologram device for splitting the emerging light from said source into a plurality of beams, said hologram device being an integral part of the entrance surface of said beam splitter; and a polarizing separation device of a diffraction type for separating the reflected light from said magnetooptical recording medium into an ordinary and an extraordinary component, said polarizing separation device being an integral part of the surface of said beam splitter and being disposed on a side of said beam splitter which is closer to said photodetector.

2. An optical pickup system according to claim 1, wherein the optical axis of said polarizing separation device is so set that it rotates approximately 45 degrees about the optical axis of the reflected light from the magnetooptical recording medium with respect to the direction of polarization of the reflected light.

3. An optical pickup system according to claim 1, wherein said hologram device comprises:

a dividing line; and at least two diffraction gratings that border on a dividing line and have different conditions of diffraction from each other.

4. An optical pickup system according to claim 3, wherein at least one of said diffraction gratings in said hologram device has a grating pattern of curves.

5. An optical pickup system with which light emitted from a source to illuminate a magnetooptical recording medium is reflected so as to read information signals comprising:

a beam splitter;

a photodetector;

a polarizing separation device of a diffraction type for separating the reflected light from said magnetooptical recording medium into an ordinary and extraordinary component, said polarizing separation device being an integral part of the surface of said beam splitter and being disposed on a side of said beam splitter which is closer to said photodetector; and a hologram device for splitting the emerging light from the source into a plurality of beams in the optical path, said hologram device being positioned between the source and said beam splitter, wherein said hologram device comprises:

a dividing line that extends generally on the optical axis in the direction orthogonal to a track on the medium;

a first diffraction grating;

a second diffraction grating; and wherein at least one of said two diffraction gratings having a capability for diffraction toward said track.

6. An optical pickup system according to claim 5, wherein said polarizing separation device has birefringent material on the surface thereof, said polarizing separation device is positioned so that one of the optical axis and the orientation of said birefringent material is made forms an angle of about 45 degrees with the direction of polarization of the reflected light from the magnetooptical recording medium.

7. An optical pickup system according to claim 5, wherein said photodetector has a light-receiving element wherein said light-receiving element comprises:

an ordinary component light-receiving element receiving the ordinary component;

an extraordinary component light-receiving element receiving the extraordinary component; and wherein said two light-receiving elements having a plurality of elements which respectively receive one light component that is diffracted and another light component that is not diffracted by said first and second diffraction gratings in said hologram device.

8. An optical pickup system according to claim 7, wherein each of said ordinary component light-receiving element and an extraordinary component light-receiving element comprises:

a first element for receiving the zero-order light which has passed undiffracted through the hologram device, a second element for receiving the plus and minus components of the first-order light which has passed with diffraction through said first diffraction grating in said hologram device; and a third element for receiving the plus and minus components of the first-order light which has passed with diffraction through said second diffraction grating in said hologram device.

* * * * *